(12) United States Patent
Jasinska et al.

(10) Patent No.: US 11,969,312 B2
(45) Date of Patent: Apr. 30, 2024

(54) ORTHODONTIC ABUTMENT

(71) Applicant: HCENTRUM SP. Z O. O., Gdansk (PL)

(72) Inventors: Hanna Jasinska, Gdansk (PL);
Przemyslaw Jasinski, Gdansk (PL)

(73) Assignee: HCENTRUM SP. Z O. O., Gdansk (PL)

( * ) Notice: Subject to any disclaimer, the term of this patent is extended or adjusted under 35 U.S.C. 154(b) by 366 days.

(21) Appl. No.: 17/614,062

(22) PCT Filed: May 28, 2020

(86) PCT No.: PCT/EP2020/064831
§ 371 (c)(1),
(2) Date: Nov. 24, 2021

(87) PCT Pub. No.: WO2020/239906
PCT Pub. Date: Dec. 3, 2020

(65) Prior Publication Data
US 2022/0226081 A1     Jul. 21, 2022

(30) Foreign Application Priority Data

May 28, 2019    (PL) .......................................... 430052

(51) Int. Cl.
*A61C 8/00*      (2006.01)
*A61C 7/14*      (2006.01)

(52) U.S. Cl.
CPC .............. *A61C 8/0096* (2013.01); *A61C 7/14* (2013.01); *A61C 2201/00* (2013.01)

(58) Field of Classification Search
CPC ............ A61C 8/0096; A61C 7/14; A61C 7/12
See application file for complete search history.

(56) References Cited

U.S. PATENT DOCUMENTS

| | | | | |
|---|---|---|---|---|
| 4,988,292 A * | 1/1991 | Rosen | ..................... | A61C 8/005 433/17 |
| 5,836,768 A * | 11/1998 | Huskens | .................. | A61C 8/00 433/172 |
| 5,993,213 A * | 11/1999 | Schiel | ...................... | A61C 8/00 433/173 |
| 6,722,879 B2 * | 4/2004 | Lin | .......................... | A61C 7/00 433/18 |
| 9,782,241 B2 * | 10/2017 | Wu | ...................... | A61C 8/0096 |
| 2005/0130093 A1 * | 6/2005 | Lin | .......................... | A61C 7/00 433/18 |

FOREIGN PATENT DOCUMENTS

| | | |
|---|---|---|
| CN | 107789080 A | 3/2018 |
| EP | 1961397 A1 | 8/2008 |

* cited by examiner

*Primary Examiner* — Ralph A Lewis
(74) *Attorney, Agent, or Firm* — Rivka Friedman

(57) ABSTRACT

An orthodontic abutment that includes a base suitable for fixing the orthodontic abutment to an implant, a cap fixed to the base and a set of retention elements arranged along a side wall of the cap. The set of retention elements is suitable for receiving orthodontic elements and includes: a bracket with wings, a hook arranged under one of the wings of the bracket, a projection arranged on the cap oppositely to the bracket, a hollow tube formed inside the projection, a curved rod hook arranged on the projection below the hollow tube, and a button with an eyelet arranged above the hollow tube.

8 Claims, 3 Drawing Sheets

US 11,969,312 B2

ORTHODONTIC ABUTMENT

TECHNICAL FIELD

The invention relates to an orthodontic abutment for fixing to dental implants.

BACKGROUND

A dental implant is an element formed as a screw or a cylinder having a thread, which is surgically fixed to a jawbone. Dental implants are typically used as a base for mounting thereon artificial teeth, via abutments.

There are known abutments, which not only constitute a base for mounting an artificial tooth, but also have retention elements for attaching orthodontic elements.

For example, a European patent application EP1961397A1 discloses an orthodontic assembly containing a retention element in the form of a button with an eyelet.

A European patent application EP2083741A2 discloses an orthodontic implant hub with a retention element in the form of a slot adapted to connect a dome to an orthodontic wire.

The disadvantage of the currently known orthodontic abutments mounted on dental implants is that they offer limited scope of cooperation with other orthodontic elements, as they typically have only a single retention element. Therefore, there is a need to provide an improved orthodontic abutment that would be tailored to the individual needs of the patient and would allow for broader possibilities of cooperation with other orthodontic elements.

SUMMARY OF THE INVENTION

In one aspect, the invention relates to an orthodontic abutment comprising a base suitable for fixing the orthodontic abutment to an implant; a cap fixed to the base; a plurality of retention elements arranged along a side wall of the cap, suitable for receiving orthodontic elements. The retention elements include: a bracket with wings; a hook arranged under one of the wings of the bracket; a projection arranged on the cap oppositely with respect to the bracket; a hollow tube formed inside the projection; a curved rod hook arranged on the projection below the tube; and a button with an eyelet arranged on the projection above the tube.

The cap may comprise a straight hook in the form of a straight plate terminated by a rounded thickening.

The cap may comprise a curved hook in the form of a bent plate terminated by a rounded thickening.

The bracket may comprise a movable gate arranged between the wings of the bracket such that in a closed position the movable gate partially closes a slot.

The button with the eyelet may be arranged on the projection.

The button with the eyelet may be arranged on top of the cap.

The cap may be integrated with the retention elements as a uniform element made in the 3D printing process.

The cap together with the retention elements may be made of a cobalt-chromium-tungsten alloy.

BRIEF DESCRIPTION OF FIGURES

Various embodiments are herein described, by way of example only, with reference to the accompanying drawings, wherein.

DETAILED DESCRIPTION

The following detailed description is of the best currently contemplated modes of carrying out the invention. The description is not to be taken in a limiting sense, but is made merely for the purpose of illustrating the general principles of the invention.

An orthodontic abutment comprises a base 1 for fixing the abutment to an implant and a cap 2 fixed to the base 1. The cap 2 can be fixed to the base 1 by adhesive or other suitable means. The base 1 can be fixed to the implant with a threaded connection or other suitable means. The cap 2 has a form of a small dome and comprises at least three retention elements.

Figure 1:
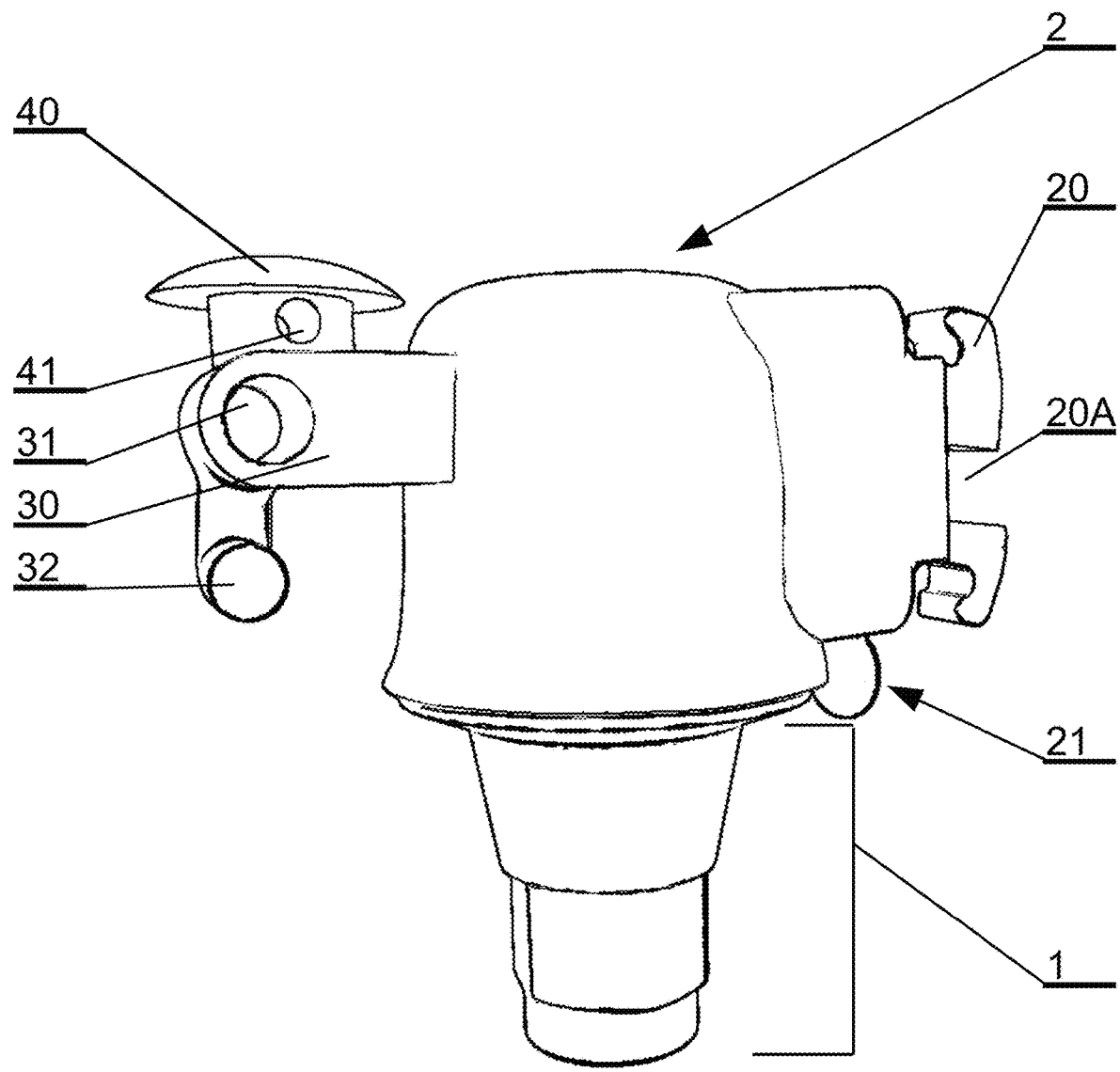
FIGS. 1 and 2 show a first embodiment of the orthodontic abutment.
Figure 2:
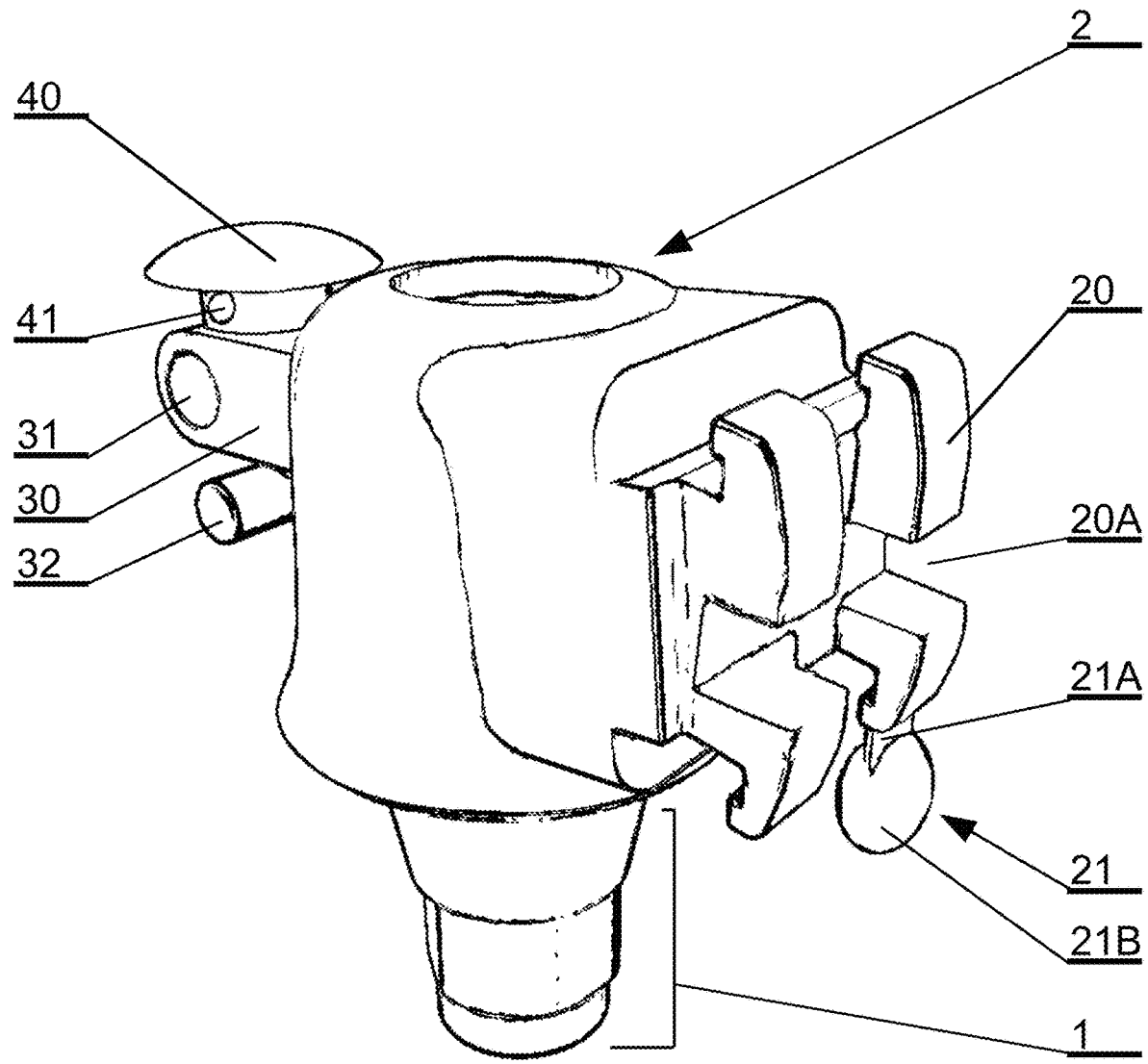

FIGS. 1 and 2 show a first embodiment of the orthodontic abutment. The retention elements include a bracket 20 with a straight hook 21, a hollow tube 31 with a curved rod hook 32 and a button 40 with an eyelet 41.

This type of orthodontic abutment is particularly suitable for orthodontic treatment. The retention elements 20, 21, 31, 32, 40, 41 are adapted to be coupled with orthodontic elements such as wires, elastics, springs, ligatures or rubber bands, for correcting dental changes. Use of a variety of retention elements allows correcting dental changes by movement of teeth in three dimensions, for a plurality treatment purposes concurrently. Furthermore, various treatment options can be applied consecutively, without the need to replace the cap 2.

For example, the slot 20A of the bracket 20 can be used to mount an orthodontic arch in the form of a wire, usually made of nickel and titanium alloy, to eliminate dental gaps and to open or close the bite. Moreover, an orthodontic arch can be mounted in the slot of the orthodontic abutment, in the form of titanium wire (TMA) or a bent steel wire for tooth displacement and closure of tooth spaces.

The straight hook 21, which is integrated with the bracket 20 and is located under one of the wings of the bracket 20 can be used for attaching elastics, such as Class I elastic rubber bands or intermaxillary rubber bands, or elastic power chains, which are also used to treat malocclusions and contribute to bite correction, improving the fit between the upper and the lower teeth and/or jaws (bite). A steel orthodontic ligature can also be attached to the straight hook 21 to support the arch in the slot 20A of the bracket 20, or closed springs, which are used to close dental spaces. Preferably, the straight hook 21 has a form of a straight plate 21A terminated with a rounded thickening 21B, which allows stable and secure fixing of the orthodontic elements.

The hollow tube 31 can be used to fix orthodontic wire, orthodontic arch (most often nickel and titanium alloy elastic arches), while the curved rod hook 32 located below the hollow tube 31 can be used to fix elastics, such as Class I elastic rubber bands or intermaxillary rubber bands, or elastic power chains. The hollow tube 31 is a through opening formed across the projection 30, having an essentially horizontal axis.

The projection 30 and the bracket 20 are arranged on the cap 2 opposite each other, i.e. on the opposite sides of the circumference of the cap 2.

The button 40 with the eyelet 41 can be used to thread metal ligature or elastic thread through the eyelet 41, while elastics and springs can be attached to the button 40.

Preferably, the button 40 with the eyelet 41 is located above the hollow tube 31. However, depending on the patient's individual needs, it can be placed for example on the top of the cap 2. Preferably, the eyelet 41 is an opening with an axis that extends in a substantially horizontal plane.

Figure 3:
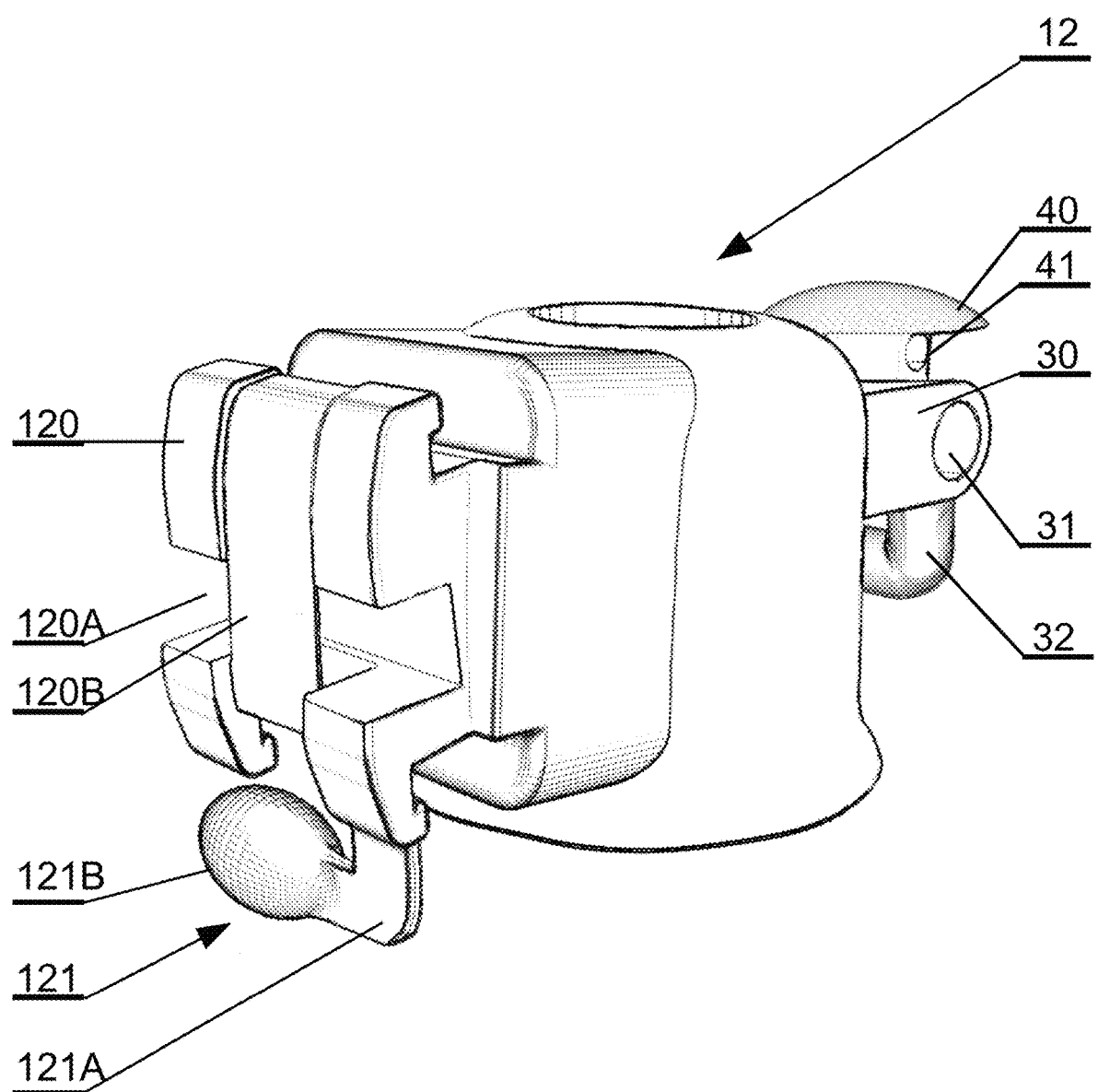
FIG. 3 shows a second embodiment of the orthodontic abutment.

FIG. 3 shows a second embodiment of the orthodontic abutment. In the second embodiment, the cap 12 comprises a bracket 120 with a curved hook 121, wherein the bracket 120 has a movable gate 120B, which is arranged between its wings, such that in a closed position it partially closes a slot 120A. This type of the bracket is called a self-ligation bracket. When the orthodontic arch is placed into the slot 120A, the movable gate 120B, in the closed position, holds the wire in place and prevents the orthodontic arch to escape from the slot 120A. In an open position of the movable gate 120B, the slot 120A is opened and allows the orthodontic arch to be introduced into the slot 120A or to be withdrawn from the slot 120A.

The curved hook 121, similarly as the hook 21 of the first embodiment, is integrated with the bracket 120 and is located under one of the wings of the bracket 120. The curved hook 120 can be used for attaching elastics, such as Class I elastic rubber bands or intermaxillary rubber bands, or elastic power chains, which are also used to treat malocclusions and contribute to bite correction, improving the fit between the upper and lower teeth and/or jaws (bite). The curved hook 121 may have a form of a bent plate 121A terminated by a rounded thickening 121B, which allows a stable and secure fixing of the orthodontic elements.

The customised cap 2, 12 can be manufactured by a 3D printing process using a suitable 3D printer, which allows producing a design tailored to the individual patient. The cap 2, 12 together with retention elements 20, 120, 21, 121, 31, 32, 40, 41 is preferably made of a biocompatible material, for example from a dental alloy in a form of powder used in laser melting technology, which contains cobalt, chromium and tungsten. One particularly suitable alloy contains 61% cobalt, 27.5% chromium, 8.5% tungsten, 1.6% silicon and less than 1% carbon, iron and manganese and optionally other additives up to 100%.

The orthodontic abutment according to the invention is capable of correcting dental changes without the need to mount complete orthodontic braces. By means of the retention elements, the orthodontic abutment allows for applying forces necessary to effect a desired dental movement, while eliminating the need to take into account the counter-reaction forces. In particular, the hollow tube 31 and the slot of the bracket 20, 120 can be used simultaneously as elements for fixing the compact arm of force, which allows the force to be applied from the centre of resistance of the tooth, allowing for precise mesial or distal displacement of the tooth, which results in the most efficient tooth displacement.

While the invention has been described with respect to a limited number of embodiments, it will be appreciated that many variations, modifications and other applications of the invention may be made. Therefore, the claimed invention as recited in the claims that follow is not limited to the embodiments described herein

The invention claimed is:

1. An orthodontic abutment comprising:
   a base suitable for fixing the orthodontic abutment to an implant;
   a cap fixed to the base;
   a set of retention elements arranged along a side wall of the cap, wherein the set of retention elements is suitable for receiving orthodontic elements and comprises:
      a bracket with wings;
      a hook arranged under one of the wings of the bracket;
      a projection arranged on the cap oppositely with respect to the bracket;
      a hollow tube formed inside the projection;
      a curved rod hook arranged on the projection below the hollow tube; and
      a button with an eyelet arranged above the hollow tube.

2. The orthodontic abutment according to claim 1, wherein the hook has a form of a straight plate terminated by a rounded thickening.

3. The orthodontic abutment according to claim 1, wherein the hook has a form of a bent plate terminated by a rounded thickening.

4. The orthodontic abutment according to claim 1, wherein the wings of the bracket are arranged as a top pair of wings and a bottom pair of wings, wherein the top pair of wings is separated from the bottom pair of wings by a slot, and further comprising a movable gate arranged between the wings of the bracket and being movable between a closed position and an open position, wherein in the closed position the movable gate overlaps the slot.

5. The orthodontic abutment according to claim 1, wherein the button is arranged on top of the projection.

6. The orthodontic abutment according to claim 1, wherein the button is arranged on top of the cap.

7. The orthodontic abutment according to claim 1, wherein the cap and the retention elements are manufactured as a uniform element in a 3D printing process.

8. The orthodontic abutment according to claim 1, wherein the cap and the retention elements are made of a cobalt-chromium-tungsten alloy.

* * * * *